(12) United States Patent
Hackenschmied et al.

(10) Patent No.: US 8,445,854 B2
(45) Date of Patent: May 21, 2013

(54) X-RAY RADIATION DETECTOR FOR USE IN A CT SYSTEM

(75) Inventors: Peter Hackenschmied, Nürnberg (DE); Christian Schröter, Bamberg (DE); Matthias Strassburg, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 93 days.

(21) Appl. No.: 12/591,577

(22) Filed: Nov. 24, 2009

(65) Prior Publication Data

US 2010/0127182 A1 May 27, 2010

(30) Foreign Application Priority Data

Nov. 25, 2008 (DE) .......................... 10 2008 059 678
Apr. 24, 2009 (DE) .......................... 10 2009 018 877

(51) Int. Cl.
*H01L 27/146* (2006.01)
(52) U.S. Cl.
USPC .................................................. 250/370.09
(58) Field of Classification Search
USPC .................................................. 250/370.09
See application file for complete search history.

(56) References Cited

U.S. PATENT DOCUMENTS

| 2006/0289773 | A1 | 12/2006 | Blevis |
| 2007/0029496 | A1 | 2/2007 | Bouhnik et al. |
| 2009/0218647 | A1* | 9/2009 | Smith et al. ................. 257/429 |
| 2010/0116998 | A1* | 5/2010 | Kim .......................... 250/370.1 |

FOREIGN PATENT DOCUMENTS

| CA | 2388424 | 4/2001 |
| DE | 4125928 | 2/1993 |
| DE | 10 2007/036821 | 2/2008 |

OTHER PUBLICATIONS

Lachish et al., "The role of contacts in semiconductor gamma radiation detectors," 1998, Nuclear Instruments and methods in Physics Research, vol. 403, pp. 417-424.*
Office Action dated Feb. 23, 2011 by the German Patent Office for German Application No. 10 2009 018877.0-52.
E. Janik et al, "Ohmic contacts to p-type cadmium telluride and cadmium mercury telluride", J. Phys. D: Appl. Phys., 16(1983) 2333-2340.

* cited by examiner

*Primary Examiner* — Christine Sung
(74) *Attorney, Agent, or Firm* — Harness, Dickey & Pierce, P.L.C.

(57) ABSTRACT

At least one embodiment of the invention relates to an X-ray radiation detector, in particular for use in a CT system. In at least one embodiment, the X-ray radiation detector includes a semiconductor material used for detection, at least two ohmic contacts between the semiconductor material and a contact material, the semiconductor material and contact material each having a specific excitation energy of the charge carriers, with the excitation energy of the contact material corresponding to the excitation energy of the semiconductor material. At least one embodiment of the invention furthermore relates to a CT system in which an X-ray radiation detector is used, the X-ray radiation detector advantageously having at least two ideal ohmic contacts according to at least one embodiment of the invention.

13 Claims, 4 Drawing Sheets

X-RAY RADIATION DETECTOR FOR USE IN A CT SYSTEM

PRIORITY STATEMENT

The present application hereby claims priority under 35 U.S.C. §119 on German patent application number DE 10 2008 059 678.7 filed Nov. 25, 2008, and German Patent application number 10 2009 018 877.0 filed Apr. 24, 2009, the entire contents of each of which are hereby incorporated herein by reference.

FIELD

At least one embodiment of the invention generally relates to an X-ray radiation detector, in particular for use in a CT system. In at least one embodiment, the X-ray radiation detector comprises a semiconductor material used for detection, at least two ohmic contacts between the semiconductor material and a contact material, the semiconductor material and the contact material each having a specific excitation energy of the charge carriers.

BACKGROUND

Scintillation detectors or direct-conversion semiconductor detectors are used for the detection of gamma and X-ray radiation, in particular in CT and dual energy CT systems. In the scintillation detectors, the incident radiation is detected indirectly by means of the excitation of electrons and the conversion into photons. By contrast, the direct-conversion detectors based on semiconductor materials such as CdTe, CdZnTe, CdTeSe and CdZnTeSe, for example, are able to count individual photons, and hence detect the radiation directly. In this case, the semiconducting detector material is electrically conductively connected to the read-out electronics and the voltage supply of the detector by way of platinum or gold contacts. However, since these contacts do not constitute ideal ohmic contacts, that is to say have different excitation energies of the charge carriers, injection of holes occurs in the case of platinum contacts and injection of electrons occurs in the case of gold contacts. This means that charge carriers are accumulated in the semiconductor. The formation of a space charge occurs, which impedes the separation and the transporting-away of the charge carriers produced by irradiation.

The space charge therefore leads to an amplification of the effect of polarization. Polarization is understood to mean the reduction of the electric field by stationary charges that are generally bound to deep defects. These deep defects can trap the charge carriers generated by radiation and recombine with them. A significantly lower intensity of the radiation is thus suggested. The polarization accordingly limits the maximum detectable flux of a direct-conversion detector.

Consequently, the performance of the detector is greatly restricted. High radiation densities such as occur in computed tomography, for example, cannot be converted into electrical pulses directly and losslessly, such that the use of direct-conversion semiconductor detectors in CT systems still does not yield completely exact measurement results.

At the present time, in the prior art there is no known possibility for realizing an ideal ohmic contact between the semiconducting detector material and some other contact material.

SUMMARY

At least one embodiment of the invention is directed to finding an ideal ohmic contact in a direct-conversion detector for the detection of ionization radiation, such that polarization-dictated effects are avoided and the detector is suitable for high-flux measurements.

The inventors have recognized that it is possible to realize an ideal ohmic contact in a direct-conversion detector of a CT system through a suitable choice of the contact material.

Various metals, alloys or stack sequences composed of various material combinations are proposed here as ideal contact materials for the conventional semiconducting detecting materials such as CdTe, CdZnTe, CdTeSe and CdZnTeSe, for example. What is crucial for the usability of the materials is the correspondence of the excitation energy of the charge carriers in the semiconductor material used and in the contact material chosen. The excitation energies should accordingly deviate not more than 100 meV from one another. This value is based on the fact that the thermal excitation energy of the charge carriers, e.g. electrons, is 25 meV at room temperature. However, since this only corresponds to the average energy of the entire particles of an ensemble, a portion of the charge carriers of this ensemble consequently has a higher energy and, when thermally excited, can surmount this relatively small barrier at the semiconductor-metal interface of approximately 100 meV.

The excitation energy in a metal is formed from the energy difference between the energy of the Fermi level and the energy of the vacuum level. For semiconductors, the excitation energy results from the sum of the electron affinity and the energy difference between the energy of the conduction band and the energy of the Fermi level. The electron affinity denotes the energy difference between the energy of the vacuum level and the energy of the conduction band.

In the case of semiconductors, the Fermi level is defined by the doping and position of the intrinsic defects. While doping materials generally lead to shallow defects, that is to say levels in the vicinity of the conduction or valence band edge, intrinsic defects and also a few elements, in particular transition metals from the eighth subgroup of the periodic system, form deep energy levels situated in the middle region of the band gap. The shallow defects can normally be depleted by activation of the charge carriers, on account of their thermal energy at room temperature, that is to say that the charge carriers have a short residence duration in these defects. By contrast, deep defects keep the charge carriers fixedly bound on account of the high energy that would be necessary for the excitation of the charge carriers. Consequently, almost all the charge carriers are automatically present in the deep defects. As a consequence of this, the Fermi level, which predefines the energy at which the attendance probability of the charge carriers is equal to half according to Fermi-Dirac statistics, is at the level of said deep defects.

Since the position of the intrinsic defect levels is predefined by the employed doping materials and growth methods for the semiconductor crystal, an ideal ohmic contact, that is to say an ideal junction between the semiconductor material and the contact material, can be obtained only when the contact material chosen is a metal or an alloy in which the excitation energy corresponds precisely to the energy of the Fermi level of the semiconductor material.

In at least one embodiment, the invention resides in the embodiment of ideal ohmic contacts for the conventional direct-conversion semiconductor detectors. This is done by suitably choosing the contact material, for example pure metals such as iridium or palladium, alloys composed of at least two metals from the group platinum, gold, iridium and palladium, or a stack sequence of the metals platinum, gold, iridium and palladium with a non-continuous platinum layer as bottommost contact layer to the semiconductor.

Ideal ohmic contacts of this type can be used for direct-conversion radiation detectors, for example in computed tomography, and also for other components, for example solar cells. The precisely coordinated ohmic contact prevents the formation of a space charge and thus prevents a possible polarization of the semiconductor.

In accordance with this basic concept, in at least one embodiment, the inventors propose improving an X-ray radiation detector, in particular for use in a CT system, comprising a semiconductor material used for detection, at least two ohmic contacts between the semiconductor material and a contact material, the semiconductor material and contact material each having a specific excitation energy of the charge carriers to the effect that the excitation energy of the contact material corresponds to the excitation energy of the semiconductor material.

In this case, the excitation energy of the contact material should deviate not more than 100 meV from the excitation energy of the semiconductor material ($\Phi_{HL}$) since this energy difference can be surmounted relatively easily, that is to say without feeding in a large amount of energy and also at room temperature.

On account of the large band gap and the magnitude of the electron affinity of the conventional semiconducting detector materials such as CdTe, CdZnTe, CdTeSe and CdZnTeSe, for example, the following contact materials are proposed for ideal ohmic contacts:

the metals iridium and palladium;
the alloys composed of at least two of the metals platinum, gold, iridium and palladium; and
stack sequences composed of the materials platinum and gold, iridium or palladium, a non-continuous platinum layer being provided as a direct contact layer to the semiconductor material.

In this case, there are various possibilities for variation of the stack sequences, a non-continuous, that is to say for example interrupted or porous, layer of platinum as a direct contact layer to the semiconductor material being advantageous in all the variants, the total number of layers not being limited. The advantage of said non-continuous platinum layers as direct contact layer on the semiconductor is the high adhesive strength of platinum on the semiconductor. This layer is advantageously only a few nm thick in order to produce a mechanically loadable contact.

A first variant is a stack sequence composed of alternating platinum layers and a metal—which is identical over all the layers—such as gold, iridium and palladium, for example. The second variant likewise comprises alternating platinum layers and layers composed of a metal, for example gold, iridium and palladium, here the metal being varied. A further variant consists in a stack composed of at least two metals from the list gold, iridium and palladium. In this case, the order and the thickness of the individual metal layers can be chosen as desired.

The non-continuous platinum layer can be embodied in porous fashion, for example, such that it has gaps. A layer thickness of at most 50 nm is advantageous in this case. The gaps in the platinum layer, that is to say the semiconductor surface not covered with platinum, can then be filled by gold, iridium or palladium and thus be contact-connected. The latter materials can preferably have a layer thickness of at least 100 nm, better at least 200 nm, even better at least 300 nm. In this case the aim is to minimize the average excitation energy in the metal. Since platinum has a very high excitation energy, an overall ohmic contact having a minimal difference between the excitation energies of semiconductor and metal electrode can be produced through a suitable choice of the coverage proportions by means of the metals gold, iridium or palladium, which have a significantly lower excitation energy.

In the third variant, that is to say the stack composed of different metal layers, it is advantageous to apply these layers such that they are in each case very thin, that is to say only a few nm thick. Layer thicknesses of a few atomic layers are also possible. In this variant, the excitation energy of a metal layer is in each case codetermined by the subsequent layers. An overall ohmic contact having a minimal difference between the excitation energies of semiconductor and metal electrode is produced on average. It is expedient if the stack in this case does not exceed a total thickness of 50 nm, better 30 nm, in order that the different properties of the metals can define the interface properties. For a standardized hybridization, that is to say for use under standardized conditions, it is possible to deposit on this stack a further layer having a necessary thickness for achieving a specific total height of the detector material. However, this covering layer then has no function with regard to the properties of the metal-semiconductor contact.

If the defect levels of the semiconductor and the Fermi level of the contact material do not lie at the same energy level, that is to say that their relative deviation from one another is greater than 100 meV, a different contact material should be chosen since either a hole- or an electron-injecting contact is otherwise obtained, which would lead to an increase in the space charge and entrails the negative polarization effects described.

At least one embodiment of the invention also includes a CT system in which a detector composed of at least one detector element, advantageously having the ideal ohmic contact according to the invention between the semiconducting detector material and a contact material, can be used, by which tomographic recordings of an examination object can be created.

On account of the embodiment of the direct-conversion detector according to the invention, even further advantages may be afforded in application:

Advantageously, with the embodiment of an X-ray radiation detector according to the invention, extremely high current flows can be measured precisely and without any artifacts since, as a result of the polarization being avoided, a lower radiation intensity than is actually present is not suggested. However, lower radiation fluxes can also be determined exactly herewith since the charge carrier collecting efficiency of such a direct-conversion detector is virtually flux-independent. This fact increases the ability of the detector to convert flux fluctuations exactly into changes in the counting rate, particularly if said detector is used as a counting detector.

Furthermore, such a detector has a higher signal-to-mode ratio since the charge carriers are trapped less frequently in deep defects and thus have a higher mobility. The smaller influence of the deep defects and the associated smaller fluctuations of the local electric field likewise bring about an improved signal stability and reproduceability of measurements. These properties of a detector that influence the precise measurability of radiation fluxes are crucial for good results primarily when an X-ray radiation detector is used in CT systems.

Furthermore, the fact that the contact materials are available in high purity and can thus be procured cost-effectively can greatly simplify the process for the production of a detector contact-connected according to the invention. The simple processing of the contact materials, for example by way of thermal evaporation and electron beam evaporation, sputtering or deposition from a liquid, can likewise simplify the production process since these methods are already used as standard for semiconductor systems, for example for GaAs and ZnSe.

In the case of the configuration of the ohmic contacts according to at least one embodiment of the invention, it is possible to use these ohmic contacts independently of the thickness of the contact material. Consequently, firstly it is possible to save material during production, and secondly it is possible to realize effectively higher field strengths even with a material thickness of significantly less than 3 mm.

Furthermore, the contacts and contact materials can also be used independently of the crystal growth method used to produce them since in the case of possible deviations of the position of the Fermi level at the semiconductor surface as a result of surface reconstructions that differ depending on the crystal growth method, and thus a different position of the excitation energies, the metal composition of the contact can easily be adapted for the given semiconductor surface. All conventional crystal growth methods can be reused for producing the semiconductor detector, for example physical vapor transport (PVT), travelling heater method (THM), vertical Bridgman methods (VBM), metal organic vapor phase epitaxy/deposition (MOVPE), various methods of vapor phase epitaxy/deposition (VPE), molecular beam epitaxy (MBE) and atomic layer epitaxy (ALE).

The composition of the contact can be checked and detected by simple substance and concentration measurements, for example by way of secondary ion mass spectroscopy (SIMS), chemical analysis, energy dispersive X-ray spectroscopy (EDX), scanning electron microscopy (REM) and transmission electron microscopy (TEM).

BRIEF DESCRIPTION OF THE DRAWINGS

The invention is described in greater detail below on the basis of the preferred example embodiments with the aid of the figures, it being pointed out that only the elements essential for directly understanding embodiments of the invention are shown. In this case, the following reference symbols are used: 1: semiconductor material; 2.1: first metal; 2.2: second metal; $E_{vac}$: energy of the vacuum level; $E_{F,HL}$: energy of the Fermi level of semiconductors; $E_{F,M}$: energy of the Fermi level of metals; $E_{L,HL}$: energy of the conduction band of semiconductor; $E_{L,M}$: energy of the conduction band of metals; $E_{V,HL}$: energy of the valence band of semiconductors; x: spatial coordinate; $\chi$: electron affinity; $\Phi_{HL}$: excitation energy of semiconductors; $\Phi_M$: excitation energy of metals; I: band structure of a metal; II: band structure of a n-doped semiconductor.

In the figures, specifically.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Figure 1:
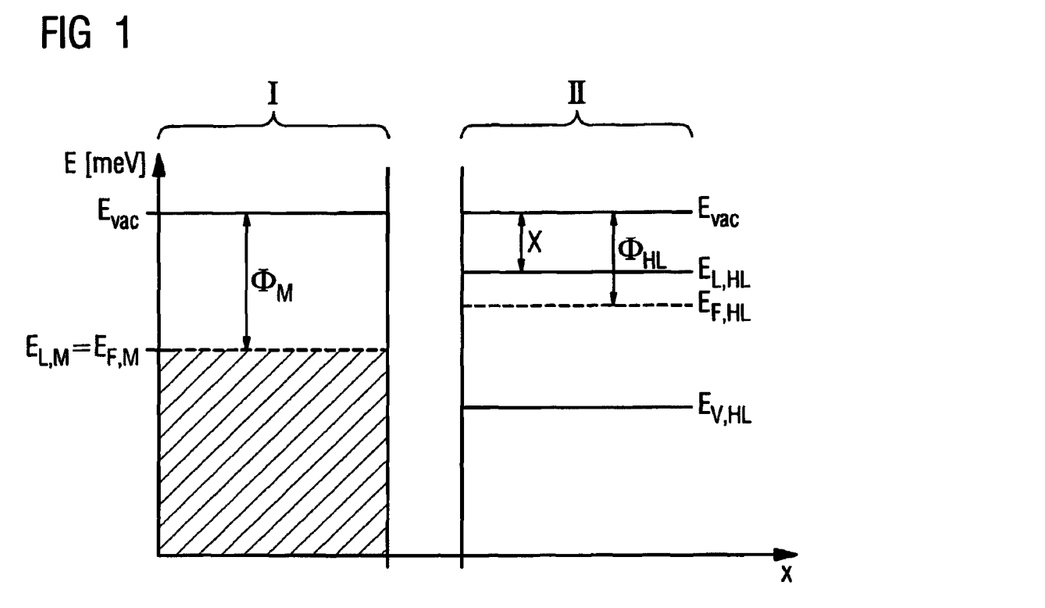
FIG. 1: shows a band structure of a metal and of an n-type semiconductor without contact.

In FIG. 1, the region I shows the band structure of a metal and the region II shows the band structure of a n-doped semiconductor before contact-connection of the materials. The charge carrier energy E with the unit meV is plotted on the ordinate and the spatial coordinate x is plotted on the abscissa. The Fermi level $E_{F,M}$ of the metal is at the same energy level as the energy of the upper band edge of the conduction band $E_{L,M}$. It corresponds to the highest energy level occupied by electrons at a temperature of zero kelvins. In addition, the excitation energy $\Phi_M$ of the charge carriers is also depicted here. It is formed from the energy difference between the vacuum level $E_{VAC}$ and the Fermi level $E_{F,M}$.

The band structure shown in the region II corresponds to an n-doped semiconductor. It is distinguished by the presence of shallow defects having the Fermi energy $E_{F,HL}$ just below the conduction band $E_{L,HL}$. The excitation energy $\Phi_{HL}$ of the semiconductor is formed from the sum of the electron affinity χ and the energy difference between the conduction band $E_{L,HL}$ and the Fermi level $E_{F,HL}$.

Figure 2:
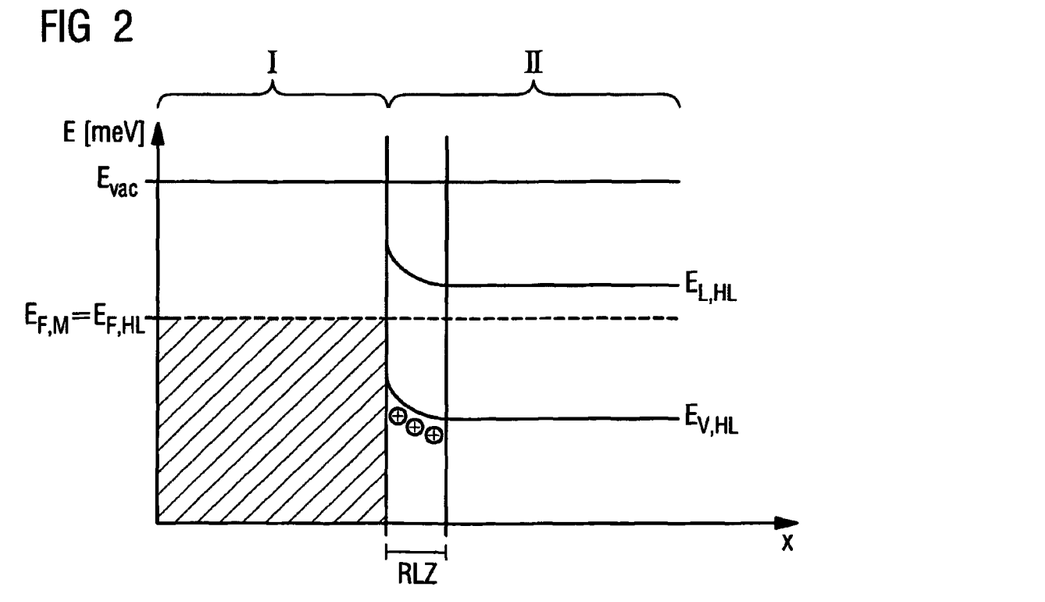
FIG. 2: shows a band structure of a metal and of a semiconductor with hole-injecting contact.

When metal is brought together with an n-type semiconductor, as is the case for an ohmic contact, for example, and is shown in FIG. 2, the electrons undergo transition from the higher-level Fermi level $E_{F,HL}$ of the semiconductor from FIG. 1 to the lower-level conduction band $E_{L,M}=E_{F,M}$ of the metal from FIG. 1. The flowing-away of the electrons results in the formation of a space charge zone, SCZ for short, which virtually no longer contains any electrons, but rather only positively charged donor ions. This injection of holes into a semiconductor occurs for example in the case of an ohmic contact between a CdSe semiconductor and a platinum layer. In the metal, the migrated electrons generate a negative space charge, the latter being limited, however, to the surface region.

The polarization which hitherto has prevented the application of direct-conversion detectors of high-flux measurements occurs on account of the space charge zone that is formed.

During the contact-connection, therefore, the Fermi levels of the metal and of the semiconductor converge and thereafter are identical $E_{F,M}=E_{F,HL}$. In addition, the attendance probability of electrons in the conduction band of the semiconductor decreases, that is to say that the Fermi level leads away from the conduction band since it is at the level of the highest energy state still occupied by electrons. The bending of the conduction band illustrates the voltage barrier which has to be overcome by the residual electrons in the semiconductor in order to be able to pass into the metal.

Figure 3:
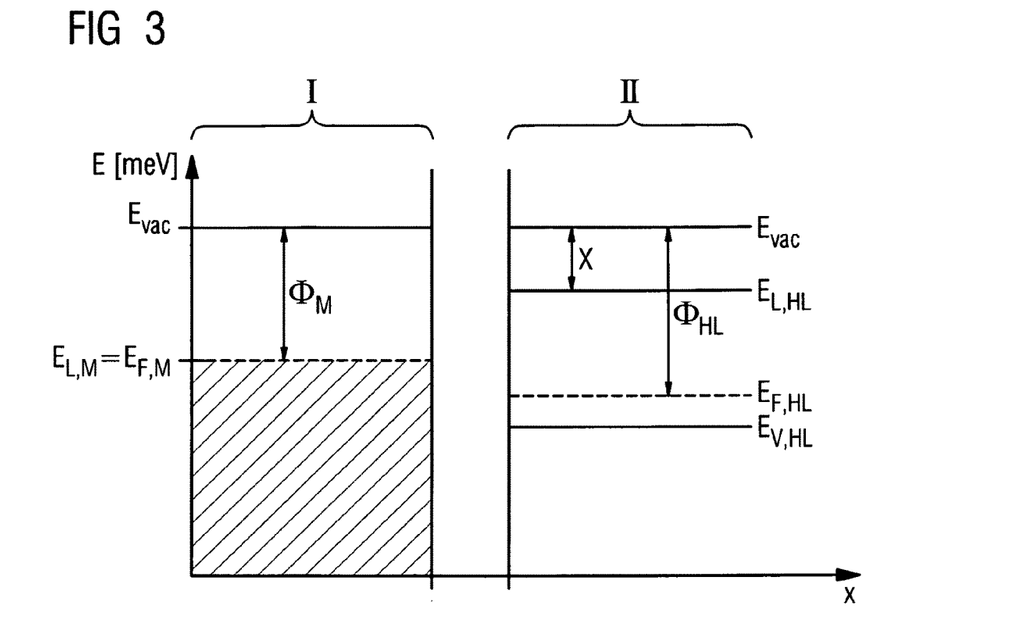
FIG. 3: shows a band structure of a metal and of a p-type semiconductor without contact.
Figure 4:
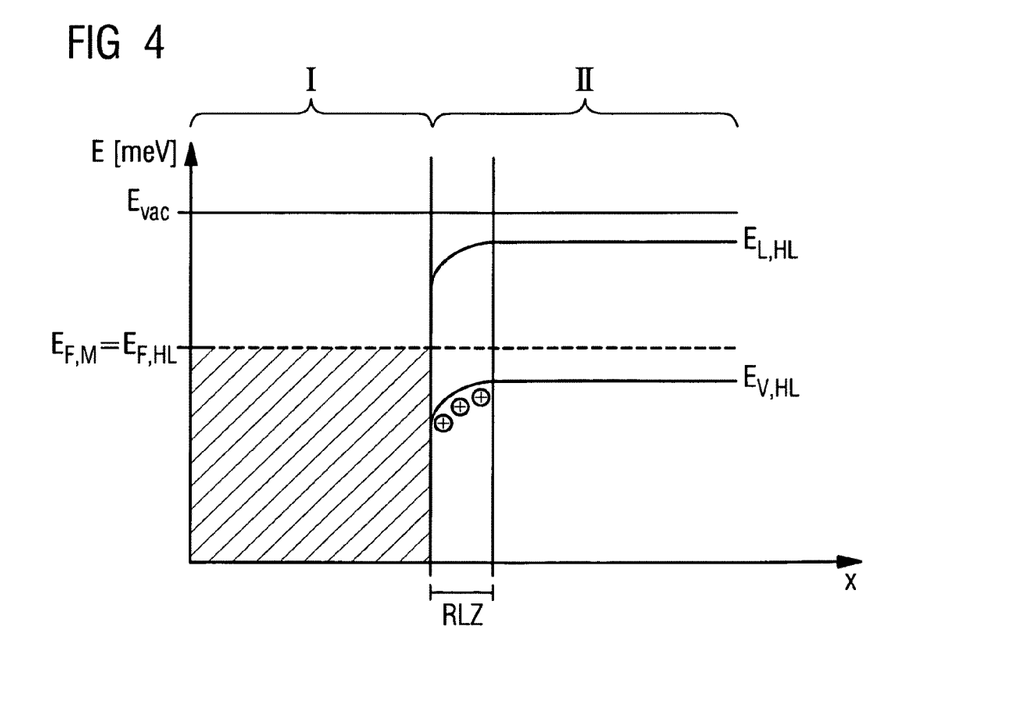
FIG. 4 shows a band structure of a metal and of a semiconductor with electron-injecting contact.

FIG. 3 shows the band structure of a metal in accordance with FIG. 1 in the region I and the band structure of a semiconductor with p-type doping in the region II. The difference from FIG. 1 consists here in the fact that the energy level of the shallow defects formed in the semiconductor lies just above the conduction band. Here, too, during contact-connection, as is shown in FIG. 4, the Fermi levels of metal and semiconductor converge as a consequence of charge carrier exchange and bending of the conduction and valence bands downward arises. The charge carrier exchange here takes place in the opposite direction to that in the n-doped semiconductor, that is to say that electrons flow from the metal, for example gold, and are injected into the semiconductor, for example CdSe. As a result, here as well, a positive space charge zone forms which prevents further charge carriers from flowing away and thus prevents a high-flux application.

Figure 5:
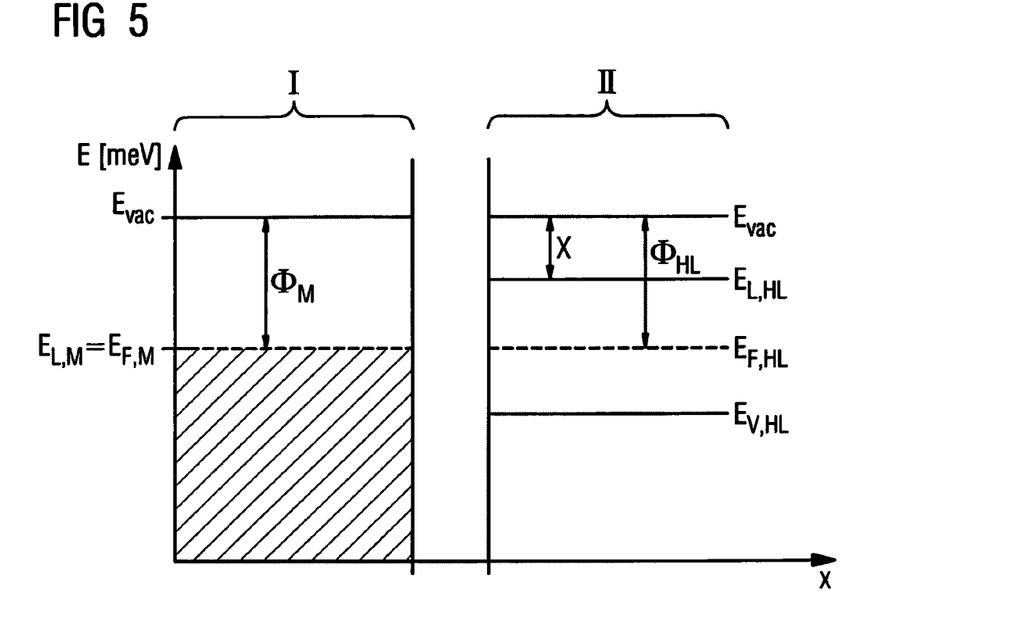
FIG. 5 shows a band structure of a metal chosen according to an embodiment of the invention and of a semiconductor without contact.

The width of the space charge zone formed depends on the intensity of the doping, that is to say on the difference between the Fermi levels of metal and semiconductor. This dependence of the width of the space charge zone on the difference between the Fermi levels or the difference between the excitation energies of metal and semiconductor is utilized in the present invention. An optimum choice of the contact material in respect of the excitation energy enables an ideal ohmic contact with a semiconductor material. FIG. 5 shows the band structure of a metal and of an intrinsic or compensated semiconductor before contact-connection. The Fermi level is situated in the center of the band gap because either there are intrinsically only very few charge carriers present, for example at low temperatures close to the zero point, or the number of free charge carriers present is greatly reduced as a result of trapping in deep defects lying in the center of the band gap. This combination is distinguished by the fact that both materials ideally have the same excitation energy for charge carriers $\Phi_M=\Phi_{HL}$, a deviation of up to 100 meV being possible without the advantages according to the invention being lost. For the conventionally used detector materials composed of CdTe, CdZnTe, CdSeTe or CdZnTeSe, for example metals such as platinum, gold, iridium or palladium are suitable as contact material.

Figure 6:
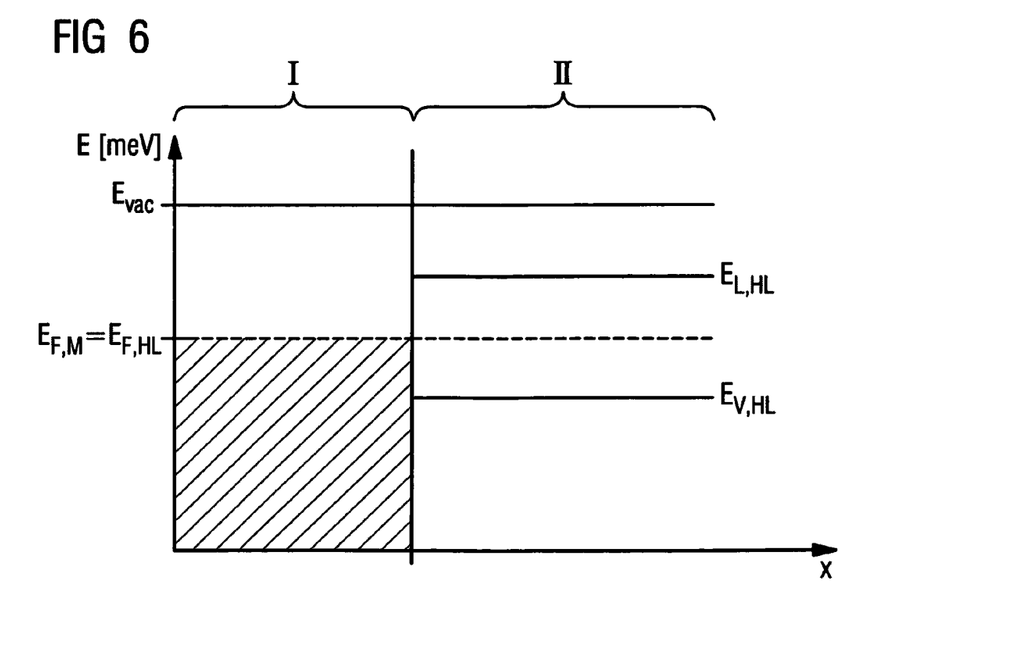
FIG. 6 shows a band structure of a metal chosen according to an embodiment of the invention and of a semiconductor with ideal ohmic contact.

As a result of the Fermi levels being at an identical level, they no longer have to converge during contact-connection of the materials, see FIG. 6. Consequently, the charge carriers do not flow away, as a result of which no electrically charged space charge zone and no band bending preventing further flowing-away of the electrons through a potential barrier arise. Consequently, the electric field is not influenced and the current generated by the charge carriers generated by radiation can actually be measured.

Figure 7:
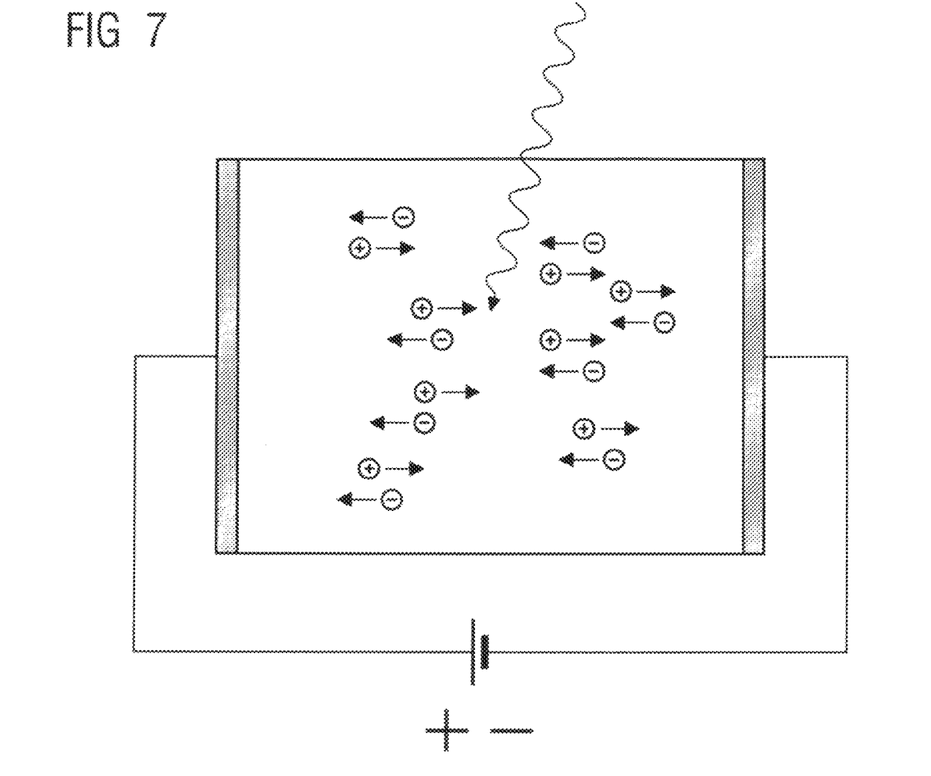
FIG. 7 shows a schematic illustration of a direct-conversion detector composed of a semiconductor material with two ideal ohmic contacts.

FIG. 7 illustrates the typical construction of a semiconductor detector. On its way through a semiconductor crystal, an X-ray or γ quantum interacts with the matter and free electrons form, which in turn release their kinetic energy by generating electron-hole pairs. The interaction between the X-ray or γ quantum and the solid takes place by way of the photoeffect, Compton scattering and pair formation. A voltage is applied to the semiconductor crystal, which voltage ensures that the electron-hole pairs generated drift through the crystal on account of the electric field and induce charge on the electrodes, which charge can be read by way of charge- or current-sensitive electronics. The flowing-away of the charge carriers into the electrodes is now made possible losslessly by virtue of the fact that the fermi level of the contact materials, that is to say of the electrodes, corresponds to that of the semiconducting detector material. As a result, no space charge zone that influences the electric field in the manner described above and promotes the polarization is formed at the boundary between semiconductor material and contact material.

Such a combination of two materials in a detector which form an ohmic contact is then suitable for high-flux applications. Accordingly, a direct-conversion detector having these ideal ohmic contacts can be used in CT systems.

Figure 8:
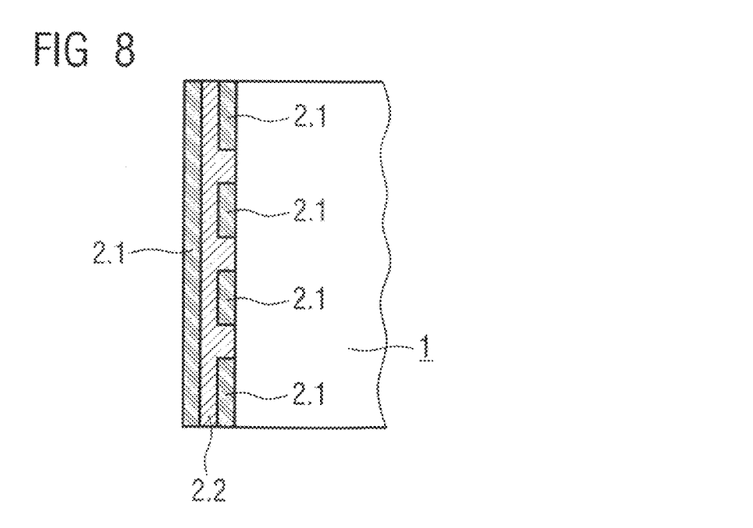
FIG. 8 shows a schematic illustration of an ideal ohmic contact composed of a stack sequence composed of two contact materials and one semiconductor material.

FIG. 8 shows an exemplary embodiment of an ideal ohmic contact. In this case, the contact material is formed from a stack sequence composed of two different metals 2.1 and 2.2, which are connected to a semiconductor material 1. The stack sequence has a partly interrupted first layer of the first metal 2.1, which is applied directly to the semiconductor material 1. A second metal 2.2 is introduced into the gaps in the first layer, said second metal simultaneously also forming the second layer. A third layer can be situated on the second layer, said third layer being composed of a further metal or else of the first metal 2.1. In this case, the metallization layers are typically applied after crystal production. In the case of crystal growth by means of layer deposition methods such as MOCVD, MBE, MOVPE, ALE, for example, thin metal layers can also already be deposited during the crystal growth by the use of suitable metal sources.

By way of example, a CdTe compound can be used as semiconductor material 1, a platinum layer and an iridium layer alternately being applied to said compound. In this case, platinum forms the first, that is to say innermost, layer and the third layer and iridium forms the second layer. In addition, firstly a Pd layer having a thickness of from one atomic layer to a few nm can also be deposited beforehand as direct contact layer on the semiconductor, in order to increase the adhesion of the stack, for example, and secondly an Au layer having a thickness of a few 100 nm can form the termination of the stack. This termination layer serves for easier handleability in the case of necessary connections to read-out circuits or in the case of direct contact with respect to the measuring apparatus. In this case, the number of layers in the stack sequence is not limited and is determined by the desired electrical contact properties and mechanical properties.

In order to produce a mechanically stable contact, for example, a combination with a high total Pt proportion in the stack, such as in the case of the layer sequences Pt—Ir—Pt—Au or Pt—Pd—Pt—Au, for example, is advantageous. In this case, the first two layers define the electrical and mechanical contact to the semiconductor, while the last two layers are principally responsible for a mechanically stable and electrically low-noise connection to the read-out circuit or to the measuring system.

Overall, therefore, an embodiment of the invention proposes an X-ray radiation detector, in particular for use in a CT system, comprising semiconductor material used for detection, at least two ohmic contacts between the semiconductor material and a contact material, the semiconductor material and contact material each having a specific excitation energy of the charge carriers, which X-ray radiation detector has been further improved in such a way that the excitation energy of the contact material corresponds to the excitation energy of the semiconductor material.

An embodiment of the invention furthermore relates to a CT system in which an X-ray radiation detector is used, said X-ray radiation detector advantageously having at least two ideal ohmic contacts according to an embodiment of the invention.

It goes without saying that the abovementioned features of the invention can be used not only in the combination respectively specified, but also in other combinations or by themselves, without departing from the scope of the invention.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An X-ray radiation detector, comprising:
    a semiconductor material usable for detection;
    at least two ohmic contacts disposed between the semiconductor material and a contact material, the semiconductor material and contact material each having an excitation energy of charge carriers, and the excitation energy of the contact material being equal to the excitation energy of the semiconductor material, wherein
    the contact material is constructed from alternating layers of platinum and an other metal, identical over all the layers, the other metal including at least one of gold, iridium and palladium, and
    a partly interrupted platinum layer is present as a direct contact layer to the semiconductor material, wherein gaps of the platinum layer are filled with the other metal.

2. The X-ray radiation detector as claimed in claim 1, wherein the semiconductor material is a material selected from a group consisting of CdTe, CdZnTe, CdTeSe and CdZnTeSe.

3. The X-ray radiation detector as claimed in claim 2, wherein the other metal is a metal selected from a group consisting of iridium and palladium.

4. The X-ray radiation detector as claimed in claim 2, wherein the contact material includes an alloy composed of at least two metals selected from a group consisting of platinum, gold, iridium and palladium.

5. The X-ray radiation detector as claimed in claim 2, wherein the other metal is constructed from a stack composed of at least two metals selected from a group consisting of gold, iridium and palladium, wherein an order and a thickness of the metals can be chosen as desired, and wherein a partly interrupted platinum layer is present as a direct contact layer to the semiconductor material.

6. A CT system comprising an X-ray radiation detector as claimed in claim 2.

7. The X-ray radiation detector as claimed in claim 1, wherein the contact material is a metal selected from a group consisting of iridium and palladium.

8. A CT system comprising an X-ray radiation detector as claimed in claim 1.

9. The X-ray radiation detector of claim 1, for use in a CT system.

10. An x-ray radiation detector, comprising:
    a semiconductor material usable for detection;
    at least two ohmic contacts disposed between the semiconductor material and a contact material, the semiconductor material and the contact material each having an excitation energy of charge carriers, and the excitation energy of the contact material being equal to the excitation energy of the semiconductor material, wherein
    the contact material is constructed from alternating layers of platinum and a metal, which varies over all the layers, the metal selected from a group consisting of gold, iridium and palladium, and wherein a partly interrupted platinum layer is present as a direct contact layer to the semiconductor material.

11. The X-ray radiation detector as claimed in claim 10, wherein the semiconductor material is a material selected from a group consisting of CdTe, CdZnTe, CdTeSe and CdZnTeSe.

12. An x-ray radiation detector, comprising:
    a semiconductor material usable for detection;
    at least two ohmic contacts disposed between the semiconductor material and a contact material, the semiconductor material and the contact material each having an excitation energy of charge carriers, and the excitation energy of the contact material being equal to the excitation energy of the semiconductor material, wherein
    the contact material is constructed from a stack composed of at least two metals selected from a group consisting of gold, iridium and palladium, wherein an order and a thickness of the metals can be chosen as desired, and wherein a partly interrupted platinum layer is present as a direct contact layer to the semiconductor material.

13. The X-ray radiation detector as claimed in claim 12, wherein the semiconductor material is a material selected from a group consisting of CdTe, CdZnTe, CdTeSe and CdZnTeSe.

* * * * *